(12) United States Patent
Kessener et al.

(10) Patent No.: US 11,195,309 B2
(45) Date of Patent: Dec. 7, 2021

(54) METHOD FOR RECONSTRUCTING A 2D IMAGE FROM A PLURALITY OF X-RAY IMAGES

(71) Applicants: Teledyne Dalsa B.V., Eindhoven (NL); Teledyne Digital Imaging, Inc., Waterloo (CA)

(72) Inventors: Yves Kessener, Veldhoven (NL); Andriy Lomako, Waterloo (CA); Joseph Miller, Tavistock (CA)

(73) Assignees: Teledyne DALSA B.V., Eindhoven (NL); Teledyne Digital Imaging, Inc., Waterloo (CA)

( * ) Notice: Subject to any disclaimer, the term of this patent is extended or adjusted under 35 U.S.C. 154(b) by 49 days.

(21) Appl. No.: 16/475,026

(22) PCT Filed: Nov. 25, 2016

(86) PCT No.: PCT/NL2016/050831
§ 371 (c)(1),
(2) Date: Jun. 28, 2019

(87) PCT Pub. No.: WO2018/097707
PCT Pub. Date: May 31, 2018

(65) Prior Publication Data
US 2019/0325617 A1      Oct. 24, 2019

(51) Int. Cl.
*G06T 11/00* (2006.01)
(52) U.S. Cl.
CPC ........ *G06T 11/005* (2013.01); *G06T 2200/08* (2013.01); *G06T 2207/10116* (2013.01);
(Continued)
(58) Field of Classification Search
None
See application file for complete search history.

(56) References Cited

U.S. PATENT DOCUMENTS

2006/0203959 A1\* 9/2006 Spartiotis ........... H04N 5/23238
378/38
2010/0080438 A1  4/2010 Nishimura et al.
(Continued)

FOREIGN PATENT DOCUMENTS

EP         0834758 A2 \*  4/1998   ......... G01N 21/6458
JP       2014/022987      2/2014
JP      2014022987 A  \*  2/2014

OTHER PUBLICATIONS

A practical method for three-dimensional reconstruction of joints using a C-arm system and shift-and-add algorithm. Li et al. (Year: 2005).\*
(Continued)

*Primary Examiner* — Delomia L Gilliard
(74) *Attorney, Agent, or Firm* — Snell & Wilmer LLP

(57) ABSTRACT

The present invention relates to a method and a system for producing X-ray images from an object. According to this invention, a shift-and-add method is used for generating a stack of linear tomography planes each associated with a different area inside the object. A set of shift values is defined from the consideration of ensuring that said stack of linear tomography planes fills in the tomographic volume with a spatial density adequate to the application. If so required by the application, some focal planes can be selectively processed for sharpness reduction in some areas to control the depth-of-field. A focus stacking method is used to synthesize a single 2D X-ray image from UPI the tomographic stack of images. A depth map of in-focus areas from the linear tomography stack can be used for creating a 3D object model.

18 Claims, 9 Drawing Sheets

(52) U.S. Cl.
CPC ............... *G06T 2207/30008* (2013.01); *G06T 2211/408* (2013.01)

(56) References Cited

U.S. PATENT DOCUMENTS

2016/0042122 A1\* 2/2016 Sato ..................... G16H 30/40
　　　　　　　　　　　　　　　　　　　　　　715/781
2017/0245813 A1\* 8/2017 Choi .................... G06T 11/005
2017/0281110 A1\* 10/2017 Mandelkern .......... A61B 6/469

OTHER PUBLICATIONS

A Technique for Generating Multiple Energy X-Ray Images. IP.com (Year: 2016).\*

\* cited by examiner

METHOD FOR RECONSTRUCTING A 2D IMAGE FROM A PLURALITY OF X-RAY IMAGES

The present invention relates to a method for processing a plurality of X-ray images of an object that have been obtained using an X-ray source and an X-ray detector, wherein each of the images corresponds to a different positioning of the X-ray source, the X-ray detector, and the object relative to each other. The invention further relates to an X-ray system comprising an image processing unit configured to implement this method.

X-ray imaging is widely employed in a wide variety of applications. For example, it is used for diagnosing human health conditions, referred to as medical X-ray imaging, for diagnosing animal health conditions, referred to as veterinary X-ray imaging, for assisting quality control measures in manufacturing and producing goods, referred to as industrial X-ray imaging, for ensuring safe transportation of goods and people, referred to as security X-ray imaging, and many other applications.

X-ray detectors could be designed following different architectures. One of the architectures of an X-ray detector is a line-scan X-ray detector. In such detectors, the X-ray sensitive elements (pixels) are set up in an N×1 matrix as in FIG. 1A, where the position of each pixel is indicated in between parentheses. A different architecture of X-ray detectors is an area X-ray detector. Pixels in an area X-ray detector are arranged in an N×M matrix as in FIG. 1B, where the position of each pixel in the matrix is indicated in between parentheses. In both cases, signals from X-ray detector pixels of the X-ray detector are read out by internal or external pixel read-out circuitry, processed and outputted in a format which is specific for the application or design of the detector or both.

In a typical geometry for X-ray imaging, the Source-to-Image Distance (SID) for both area and line-scan X-ray detectors is large compared to the X-ray focal spot size. Such imaging setup typically exhibits a large Depth-of-Field (DOF). This means that the position of the imaged object over the SID has little impact on the sharpness of the image.

A large DOF comes with a drawback, as the X-ray images from the X-ray detectors are not preserving the relative scale of objects or the object's internal features. That happens because almost all X-ray sources are producing a diverging X-ray beam, which results in a 'projection-imaging' geometry of objects. As a result, a small object close to the X-ray tube could appear larger in the image compared to a physically larger object that is positioned closer to the X-ray detector.

Visible light imaging applications, such as for example in-line quality control, LCD inspection or semiconductor mask and wafer inspection, often use area mode detectors in a special way that simulates line-scan operation, called Time Delay and Integration (TDI), see FIG. 2. In TDI mode, the signal integration is not static during the integration time, and the image, which is captured through a lens (2) and which is integrated, is moved over detector (1) synchronously with the movement indicated by arrow (3) of object (4). In this way, the exposure time is increased many times over the exposure of a single pixel and very low light intensity scenes can be imaged with high resolution and much improved Signal-to-Noise Ratio (SNR). The mentioned image movement is typically made by one row of pixels at a time. Therefore, the output signal is electrically equivalent to operation of a line-scan detector. The benefits of the TDI mode of operation in visible light imaging applications are only realized if the speed of detector operation and the speed of object movement are precisely synchronized. When these movements are not properly synchronized, the imaging result is usually not satisfactory.

The TDI principle is also applicable to X-ray imaging. For example, an area mode X-ray detector can be operated in TDI mode and the sensitivity and SNR will be many times higher compared to a line-scan X-ray detector of the same native pixel size. Different to a visible light TDI imaging mode, a mismatch between the speed of TDI operation and the movement of the object in X-ray imaging does not necessarily result in absent image content. As X-rays have the capability to penetrate matter, the area within the object with the same linear speed of movement as that of the image in the detector image plane will be in focus in the X-ray image. Such area is called a 'linear tomography focal plane', hereinafter sometimes abbreviated to 'focal plane'.

The phenomenon described above is used in X-ray imaging applications to produce focused images of selected areas inside the object and the technique is called linear tomography. Because linear tomography limits in-focus imaging of the object features to the focal plane only, it reduces the DOF compared to a conventional area mode detector using the same X-ray setup geometry. This feature could be useful in medical or dental X-ray applications where the goal of imaging is to discriminate between object features, which normally would be superimposed in a conventional X-ray image. The best example of such an application is dental panoramic X-ray imaging. The anatomic complexity of the dento-maxillo-facial region of the human head makes visualization of areas of interest inherently difficult.

From its origins in the early 1960s, dental panoramic X-ray imaging has relied on the linear tomography principle to produce diagnostic images. In a typical panoramic X-ray system, the X-ray source and X-ray detector have a fixed mutual positioning, e.g. they are both mounted on an opposite end of an X-ray system gantry, and are rotated around the patient's head. Beginning from the late 1990s, panoramic imaging adopted digital imaging technology but still relied on the linear tomography principle for creating 'unobstructed views' of upper and lower jaw and dentition.

In general, there are many features of human head anatomy expected to be visible in a panoramic X-ray image. The volume that includes these features is called the focal trough. The focal trough is a complex three-dimensional volume, and FIG. 3A shows the profile of the focal trough (5) as compared to jaw dimensions. Typically the required focal trough is achieved by rotating a gantry with X-ray source and X-detector around the patient's head with the center of rotation during the scan following a trajectory (6) schematically shown in FIG. 3B. This trajectory is allowing for the best visualization of the average anatomy of the dento-maxillo-facial region. Moreover, this trajectory and some other system level arrangements results in an acceptable positioning of the focal trough as well as reduced scale distortions in the panoramic X-ray image. In actual dental practice, either because of errors in patient positioning or actual patient anatomy deviating from the assumed average anatomy pre-programmed into the machine operation, the narrow DOF of linear tomography often results in actual focus trough missing the proper position against the features of patient's anatomy. This causes reduced sharpness in areas of interest in the panoramic X-ray image.

A method for processing a plurality of X-ray images of an object is known from US 2010/0246761A1. This method comprises running an algorithm on a processor for shifting and adding corresponding pixel values from at least two different X-ray images to compose an image pixel in a panoramic image.

It is an object of the invention to provide a method for generating a panoramic image with improved sharpness, the panoramic image preferably having a DOF that includes all or as many variations in anatomy of the patient in one standard setting without any individual patient-specific adjustments.

This object is at least partially achieved with the method as defined in claim 1, which comprises the steps of using a shift-and-add method for generating a plurality of focal planes from the plurality of X-ray images, each focal plane being associated with a different area of the object, and using a focus stacking method for generating a two-dimensional (2D) image from the plurality of focal planes for generating a plurality of focal planes from the plurality of X-ray images acquired by the X-ray detector. Each focal plane is associated with a different area inside the object. A focus stacking method is then used for generating a 2D image from the plurality of focal planes.

The shift-and-add method and the focus stacking method are known in isolation from the prior art. The applicant has found that by combining these two known methods, the quality of the resulting 2D X-ray image can be improved considerably when compared to the prior art approaches.

The X-ray detector can be an area mode X-ray detector operating in continuous frame capture mode. Continuous frame capture mode means that the X-ray detector is continuously generating multiple X-ray images during the time the X-ray source emits X-rays at intervals of time defined by either internal circuitry or it is triggered so externally. This mode is known in the art.

The X-ray source and X-ray detector are preferably kept at a fixed positional relationship with respect to each other during the obtaining of the plurality of the X-ray images. Furthermore, during the obtaining of the plurality of X-ray images, the X-ray source and X-ray detector are preferably moved, whereas the object is preferably kept stationary.

The method may further comprise correcting a generated focal plane to account for scale distortion caused by a movement of a center of rotation of the combination of the X-ray source and X-ray detector during the movement thereof to produce a corrected focal plane. The trajectory of such center of rotation is for example illustrated in FIG. 3B.

Using the shift-and-add method may comprise selecting a first image among said plurality of X-ray images, selecting a second image among said plurality of X-ray images different from the first image, shifting at least one of the first and second image with respect to the other of the first and second image, and, after having performed said shifting, adding the first and second images for constructing a focal plane. Furthermore, the method may comprise determining a first positional shift from a difference in mutual positioning of the X-ray detector, X-ray source, and the object at the time of recording the first and second image, determining a second positional shift or shifts that was/were applied during said shifting at least one of the first and second image, and associating an area inside the object with the focal plane that was generated using the first and second images based on the first and/or second positional shifts.

Using a focus stacking method may comprise, for a given focal plane, determining a focused region in a focal plane that corresponds to a part of the area inside the object associated with that focal plane that is imaged in-focus in said focused region. Focused regions may be determined for each of the focal planes. These regions may be combined when generating said 2D image.

The method may further comprise equaling a size of the focal planes at least in a direction where a shift of the underlying X-ray images has been applied during the shift-and-add method.

The plurality of X-ray images from the X-ray detector can be stored in computer memory prior to performing the shift-and-add method and/or the focus stacking method.

The method may further comprise using a depth map of respective areas that are in sharpness in respective focal planes for constructing a 3D model of the object. The depth map comprises, per pixel, depth information or other distance information pertaining to the distance between the X-ray detector and that part of the object that corresponds to the pixel in question. This distance information is obtained by applying the shift-and-add method.

Each focal plane can be inspected for areas that are sharp. The image information of those areas, e.g. grey values, can be used in conjunction to construct a 3D model. In this model, different pieces of the model of the object are obtained from different focal planes.

The shift-and-add method and/or focus stacking method can be performed in real-time using a Graphic Processing Unit or any other dedicated computer hardware capable of processing images.

The method may further comprise selective image processing of some areas of the focal planes before performing the focus stacking method, to control a depth-of-field (DOF) in the generated 2D image. For instance, the selective image may comprise blurring areas that do not correspond to a region of interest of the object. The contribution of the blurred areas in the various focal planes to the corresponding area in the final 2D image is therefore reduced compared to the contribution of the area in the focal plane that was selected as part of the focus stacking method, for forming the area in the final 2D image. Alternatively, if a corresponding area is blurred in each of the focal planes, it becomes possible to ignore or discard such area altogether.

The method may comprise associating a set of shift values to X-ray images among the plurality of X-ray images, shifting the individual X-ray images by their associated shift value, and adding the plurality of X-ray images after performing said shifting. Consequently, by shifting one X-ray image relative to another X-ray image, and by adding both images after shifting a focal plane, or part thereof, can be obtained. It should be noted that not each X-ray image among the plurality of images needs to be associated with a shift value as it is the relative shift that is important.

The method may further comprise selecting the set of shift values for the shift-and-add method to achieve a non-uniform spatial density of the plurality of generated focal planes. A non-uniform spatial density refers to a non-uniform distribution of the focal planes over the distance between X-ray detector and object.

The plurality of X-ray images may have been obtained using an X-ray source that emitted X-rays having an average X-ray energy that alternated between two or more selected fixed values, wherein the plurality of X-ray images comprises a plurality of subsets of X-ray images, each subset of X-ray images corresponding to one fixed value for the average X-ray energy. In this case, the method preferably further comprises performing the shift-and-add method and the focus stacking method for each subset of X-ray images separately to generate a respective 2D image. These respective images may be combined to generate a single 2D image.

Furthermore, the plurality of X-ray images may be generated by an energy-discriminating X-ray detector.

Bone and soft tissue show different absorption coefficients for different X-ray energies. Hence, by using a suitable X-ray energy either the bone or the soft tissue can be imaged accurately. By using the subsets as described above it becomes possible to combine the information from both the bone and soft tissue in a single 2D image.

According to a further aspect, the invention provides an X-ray system that comprises an X-ray source, an X-ray detector, and a moving unit for causing a relative movement between an object to be imaged and at least one of the X-ray detector and the X-ray source during a process of obtaining a plurality of X-ray images. The system further comprises an image processing unit, such as a GPU, configured to implement the method as described above for generating the 2D image from said plurality of X-ray images.

The system may further comprise a mounting frame. Furthermore, the X-ray source and the X-ray detector may have a fixed positional relationship, wherein the X-ray system can be configured to, using the moving unit, move the object relative to the X-ray source and X-ray detector, which are kept stationary relative to the mounting frame. Alternatively, the X-ray system can be configured to, using the moving unit, move the X-ray source and X-ray detector relative to the object, which is kept stationary relative to the mounting frame.

The system may further comprise a memory for storing the plurality of X-ray images from the X-ray detector prior to performing the shift-and-add method and/or the focus stacking method.

According to a further aspect, the present invention provides a computer readable data carrier comprising instructions, which, when executed by an image processing unit, cause the implementation of the method as described above.

Next, the invention will be described in more detail by referring to the appended drawings, wherein:

FIG. 1 presents two known configurations for X-ray detectors;

Figure 1A:
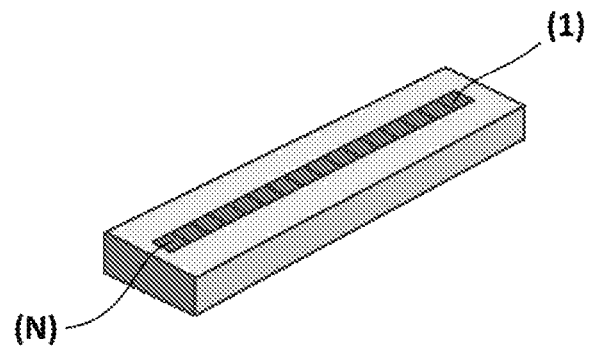
Figure 1B:
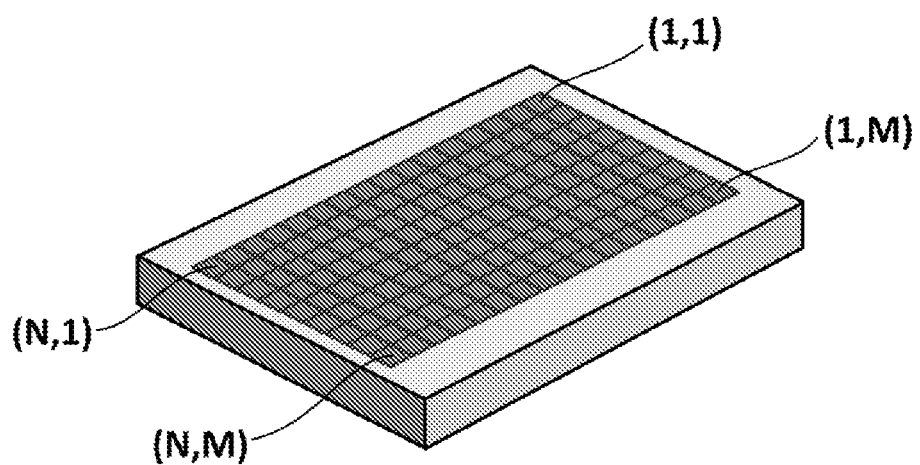
Figure 2:
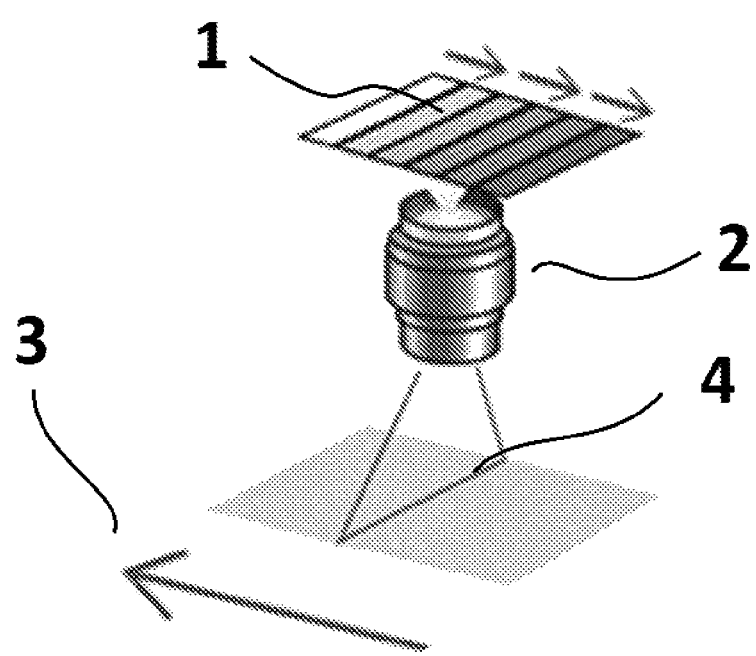
FIG. 2 illustrates the concept of linear tomography.

X-ray imaging techniques predominantly use a cone-shaped X-ray beam. The reason is that practical sources of X-rays are X-ray tubes, which emit X-rays from a small area on the X-ray tube anode called the X-ray focal spot. Because the X-ray beam is conical there is a geometric magnification factor associated with a given X-ray setup. In most cases, it is advantageous to reduce the magnification factor as much as possible to avoid imaging artefacts like geometrical distortions and image blur caused by the finite X-ray tube focal spot size. To realize such, the SID in the imaging setup is usually selected to be as large as possible for a given power of the X-ray tube, expected exposure times, radiation leakage and other practical considerations. This approach is typical for both scanning and area mode X-ray imaging applications.

Even if the magnification factor of the X-ray imaging setup is small, it still impacts the imaging results in linear tomography imaging with a TDI-mode detector. As mentioned above, only the object area, which has the same linear speed of moving over the detector image plane as the speed of TDI signal transfer, will be imaged in focus. This could result in only a part of the object being captured in focus in the TDI X-ray image.

Certain X-ray detectors operate in TDI imaging mode by design, and the results of scanning X-ray examinations cannot be modified as the image of a single focal plane is outputted by the detector and it is being generated inside the detector in the analog domain. This situation is different for an area mode X-ray detector that is operating in continuous frame capture mode. The set of frames acquired from such detector during image acquisition can be digitally processed to generate multiple focal planes, using the shift-and-add method. The shift-and-add method constitutes in essence a 'digital TDI' image reconstruction technique. Therefore, the term 'TDI' will be applied to both traditional analog and digital TDI imaging modes without distinction, except when it is important to the subject matter. The shift value used for the shift-and-add method does not need to correspond exactly to the size of a single pixel or integer number times this size. It also could be a fraction of the native X-ray detector pixel size. The choice of shift values for the shift-and-add method is equivalent to adjustments made to the analog TDI signal transfer speed to control the relative speed of signal movement over the detector image plane, i.e. the smaller the shift value, the slower equivalent speed of object movement will be captured by the generated image and the closer the generated focal plane will be in space to the X-ray detector. This also implies that by varying the shift value it is possible to control the position of the corresponding focal plane over the SID. According to the invention, multiple focal planes can be generated from the same original set of X-ray images from the X-ray detector by varying the shift value for shift-and-add method. Generation or reconstruction of multiple focal planes from the same set of image data could substantially improve image quality and add valuable functionality in many X-ray imaging applications, examples of which will be provided below. The invention is however not limited to these applications.

One of the X-ray imaging applications where the method of this invention could improve the quality of X-ray examination is dental panoramic X-ray imaging.

Figure 4:
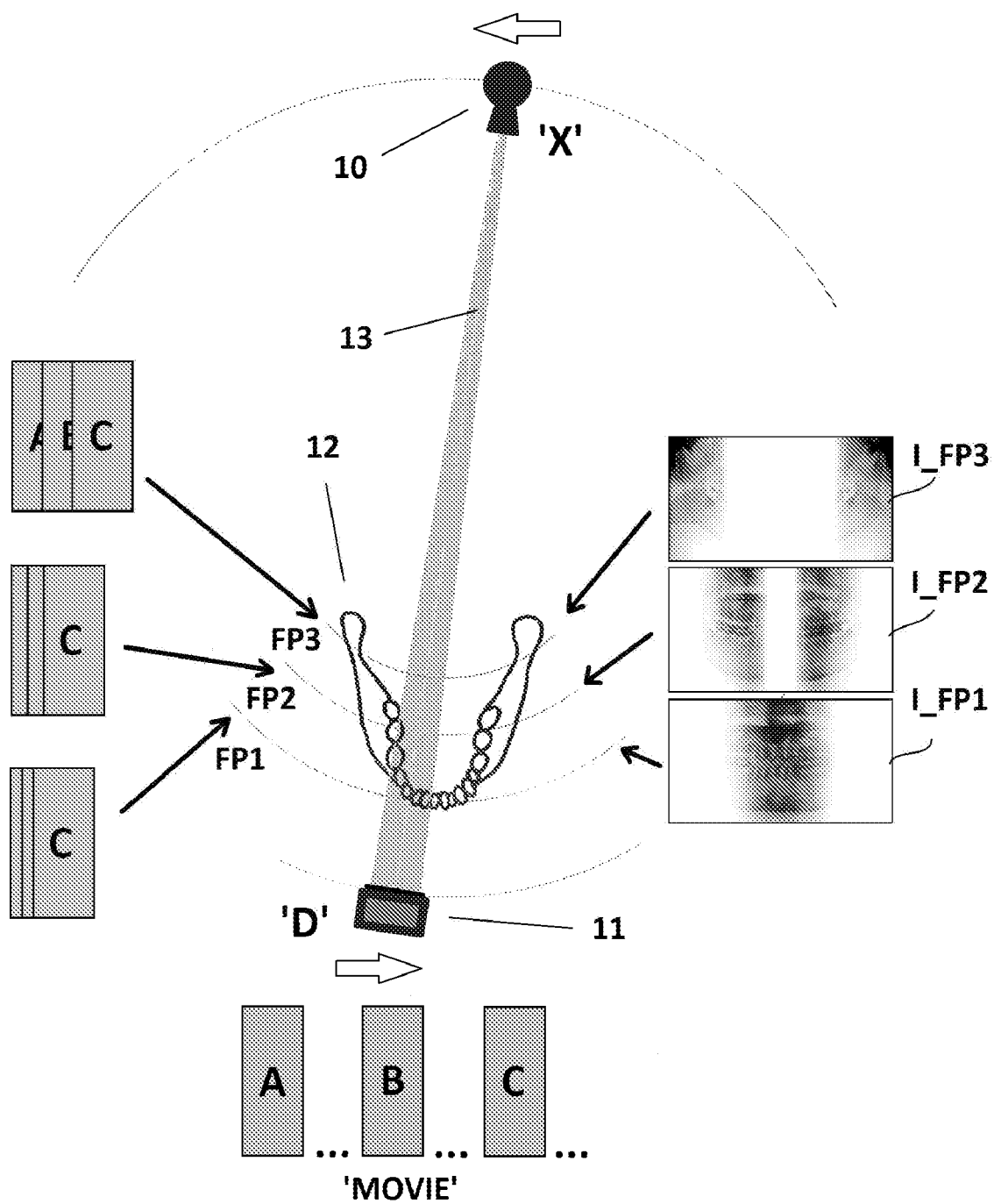
FIG. 4 illustrates the application of the shift-and-add method for generating a plurality of focal planes in correspondence with the present invention.

FIG. 4 shows the principle of reconstructing multiple tomographic planes for an X-ray panoramic application using a circular geometry, which is chosen for simplicity. A gantry with an X-ray detector (11) and X-ray source (10) orbits the patient's head (12) at constant speed. The X-ray source (10) emits a narrow beam (13) of X-rays, which is captured by the X-ray detector (11). The X-ray detector (11) is operating in continuous frame capture mode at constant frame rate, producing a 'movie' M of X-ray images A, B, C, and so forth.

According to the invention, multiple focal planes I_FP1-I_FP3 are produced using the shift-and-add method with different shift values. FIG. 4 shows the dependence of the position for generated focal planes FP1, FP2, and FP3, on the shift value (not to scale). A focal plane closer to X-ray source (10) requires a large shift value to be applied to the underlying X-ray images A, B, C, in order to generate the corresponding focal plane as features in this plane have higher relative speed of moving over the X-ray detector plane than the other shown planes.

Figure 5:
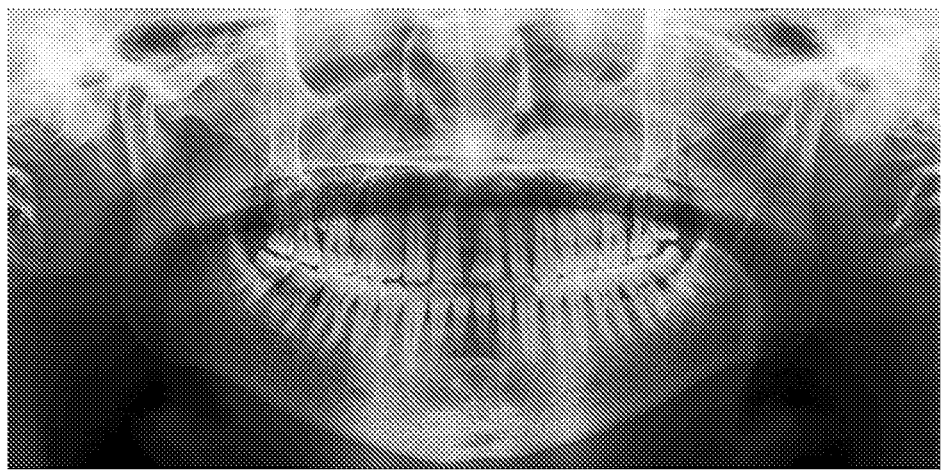
FIG. 5 illustrates an example of a dental panoramic image.

No single reconstructed focal plane captures all the required features of jaw anatomy in focus as the curvatures of the generated focal planes and the jaw profile are very different. FIG. 5 shows only a few focal planes reconstructed from digital data acquired by the X-ray detector. By changing the shift values for the shift-and-add method, a stack of focal planes can be reconstructed. Furthermore, the set of shift values for the shift-and-add method could be selected in the way the said stack of focal planes will fill in the volume occupied by the jaw with small spacing between the focal planes. An obvious inference to this is the fact that the image of interest is becoming 'distributed' over the totality of focal planes. According to the invention, in order to 'extract' a single panoramic X-ray image the totality of focal planes is processed using a focus stacking operation. An example of such an image is provided in FIG. 5.

As stated above, the in-focus image contents in the focal planes at different distances from the X-ray source exhibit different magnification, and the position of the focal plane over the SID defines the magnification. It could be trivially shown that the single parameter that defines said position of the focal plane (FPn) over the SID, in a simplified geometry as shown in FIG. 4, is the shift value of the shift-and-add method used for reconstructing said focal plane. Therefore, the focal planes could be re-sized to the same magnification in digital domain, based solely on the respective shift values used in the shift-and-add method.

Figure 6:
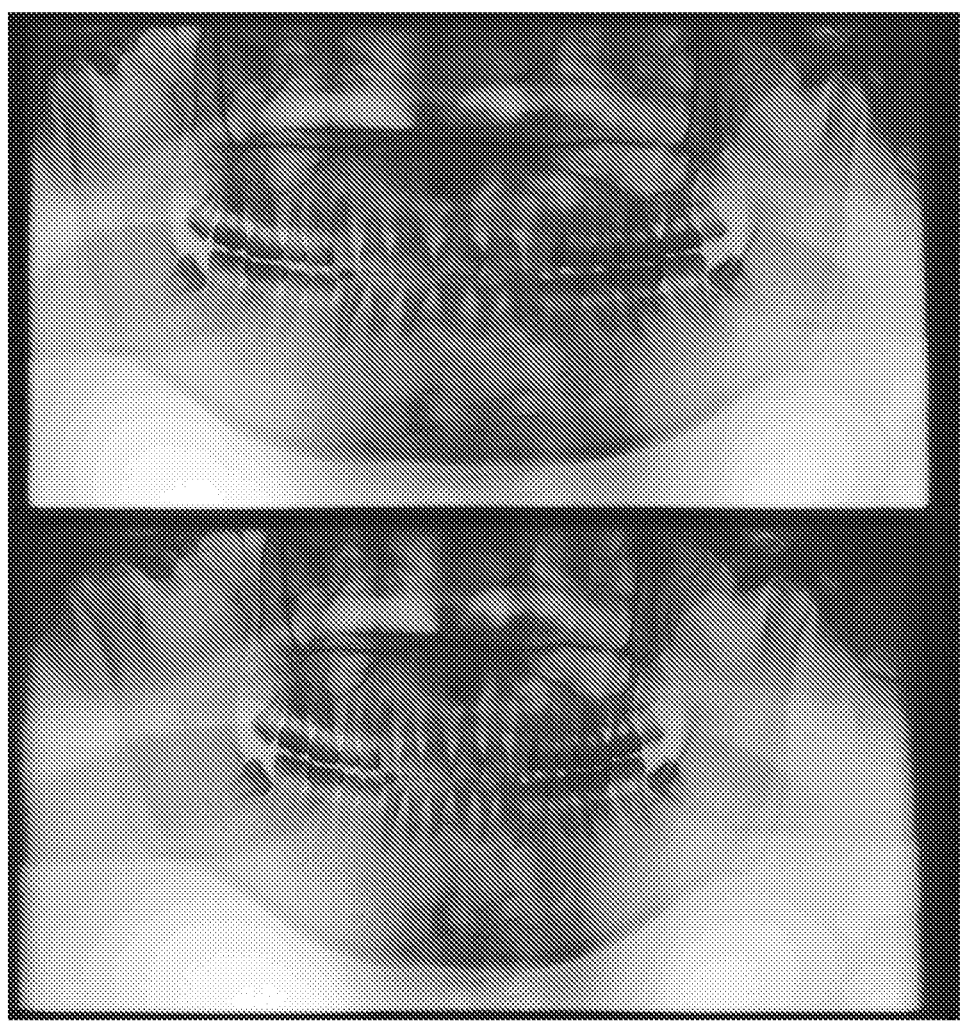
FIG. 6 illustrates the correction of a focal plane for spatial distortions.

Because the rotation of the gantry in actual commercial panoramic X-ray machines is not circular, the method above will not fully compensate for differences in magnification for generated focal planes in practical imaging conditions and the panoramic image will show some scale distortions. For example, the front (anterior) teeth will be shown larger in scale compared to the teeth in the molar (posterior) jaw area. FIG. 6 shows how the original focal plane (top) could be digitally corrected for scale distortions caused by movement of the center of rotation of the X-ray console, i.e. the gantry with the X-ray source and X-ray detector, to produce a corrected focal plane (bottom). This additional scaling depends on the specific design of the panoramic machine, which is known or can be derived through a straightforward calibration routine.

It is important to recognize that this correction in the digital domain is not artificial and it achieves identical or similar results as other existing imaging techniques and algorithms for creating panoramic images. The reason is these other approaches are also compensating for magnification errors in the panoramic setup by other aspects of panoramic machine design, like the mechanical design of the rotating parts, X-ray detector frame rate, image reconstruction, etc. Any deviations of the actual anatomy of the patient from assumed curves of upper and lower jaws in these systems result in scale distortions in the traditional panoramic image too Small amounts of scale distortions in panoramic X-ray images are acceptable in the dental industry, as X-ray panoramic images are not used for biometrical purposes. Dental OEMs typically put a disclaimer in the user documentation of their systems, stating that images are produced based on assumptions of standard or average anatomy of the patient.

Equipment for panoramic X-ray imaging exhibits a variety of system architecture decisions to enable panoramic imaging. Actual machines could be substantially different in the way the image acquisition is implemented. The type of orbital movement, detector frame rate, pixel size, detector orientation, SID, distance of X-ray detector from the patient, scanning time, could differ. These and other system level decisions will determine how many tomographic slices at which spacing will be required to generate a satisfactory panoramic X-ray image. FIG. 7 shows panoramic images of a dental skull phantom produced from the same set of frames captured by an area mode X-ray detector in a commercial panoramic imaging system. The image on the left is produced by an existing technique of reconstructing the panoramic image using the assumption of average patient anatomy, while the image on the right is produced using the method of this invention. Both images show very good sharpness and a high degree of similarity otherwise.

Figure 7A:
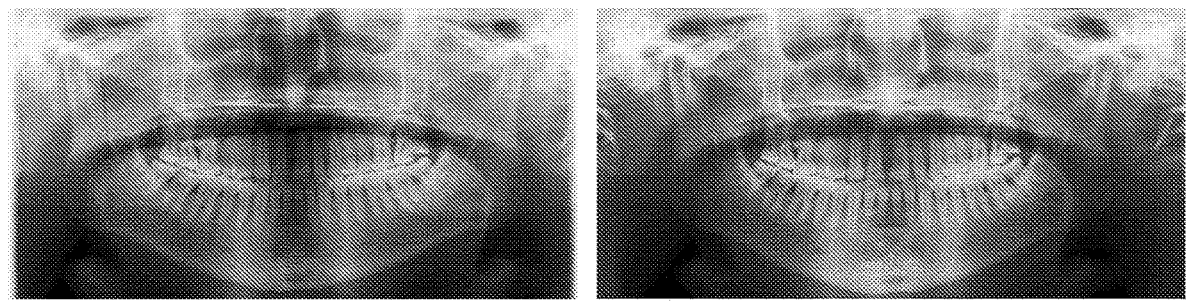
FIGS. 7A and 7B illustrate a comparison between dental panoramic images obtained using a prior art approach and an approach in accordance with the present invention.
Figure 7B:
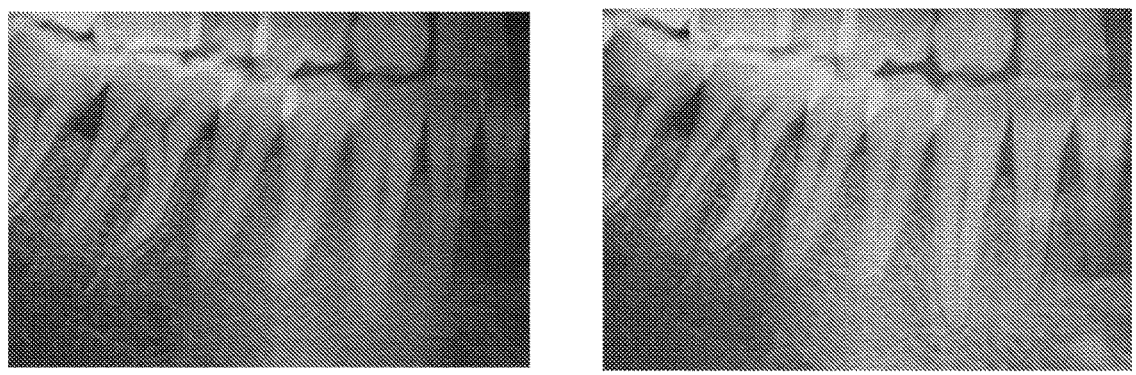

FIG. 7B provides a zoomed view on the anterior region of the images in FIG. 7A. It can be seen that reconstruction using the method of this invention overcomes a slight misplacement of the phantom, and captures details of the front teeth with better resolution than the standard reconstruction technique. It is important to note that the image on the right in FIG. 7B, corresponding to the figure on the right in FIG. 7A, is produced without using any actual information regarding SID, X-ray detector frame rate, acquisition time, etc. from the dental X-ray system. The only assumption used in reconstruction is that both orbital mechanical movement and detector frame rate were kept constant during image acquisition.

An additional benefit of the method of this invention in panoramic imaging applications, potentially simplifying the design of future dental panoramic systems, is that the large DOF provided by a synthetic 2D image produced by focus stacking of the generated focal planes removes the need for movement of the center of rotation of the gantry with the X-ray source and X-ray detector, enabling significant reductions in cost and complexity of the dental X-ray system. Simple circular rotation of the gantry will produce geometrical distortion caused by differences in magnification for anterior and posterior teeth, which can still be effectively corrected in the digital domain during post-processing of the image.

Figure 3A:
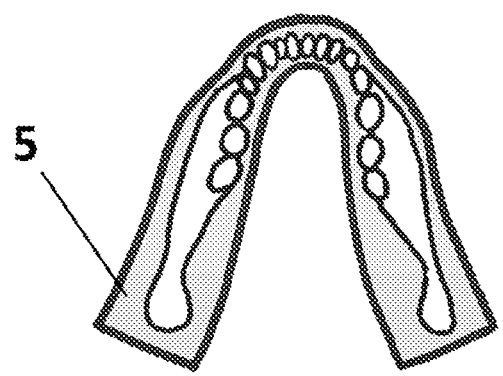
FIGS. 3A and 3B illustrate the focal trough.
Figure 3B:
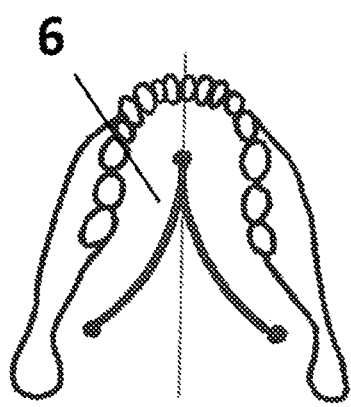
Figure 8A:
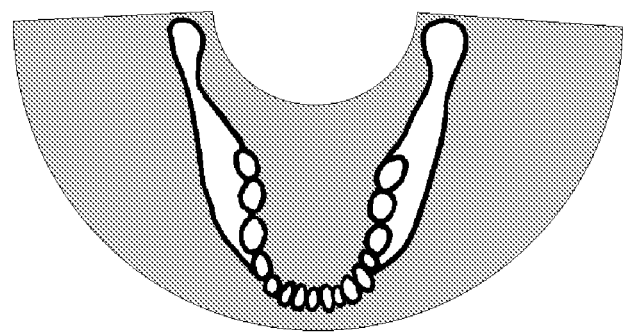
FIGS. 8A and 8B illustrate the dental focal trough in accordance with the present invention.
Figure 8B:
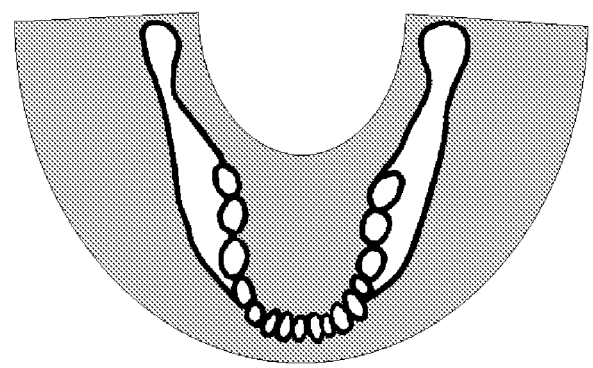

FIGS. 8A and 8B show the approximate position of the focus trough for a panoramic imaging modality, or the DOF in more generic terms, using the method of this invention for producing a 2D panoramic image for a simple circular geometry (FIG. 8A) and an industry standard gantry rotation (FIG. 8B). The area of the focus trough expands over the minimum required area as shown in FIG. 3A. This expansion does not add any new features to the panoramic image, as the added areas contain only soft tissue not visible in the panoramic X-ray image because of the relatively hard spectrum of the panoramic X-ray beam that reaches the X-ray detector. Still, if the reduction or any other change to the shape or a position of the DOF is required, it can be achieved by intentional image blurring in the respective areas of relevant focal planes in the generated stack of focal planes. The focus stacking procedure will omit information from these areas and the resulting DOF will exclude the locations in the volume occupied by the processed areas. Said blurring could be achieved by, for example, applying a Gaussian blur filter or any other low pass image filtering method.

The method of the invention produces a tomography image stack, in which image coordinates can be calculated to correspond precisely to spatial coordinates. This means that another dental X-ray imaging application, cephalometry, which is the analysis of the dental and skeletal relationships in a human head, is also suitable for the application of the method of this invention. The current approach for cephalometry is to use a large SID up to 2 meters in order to reduce the difference in magnification ratios at the front and the back of a human head. This allows for a cephalometric X-ray image to be obtained that can be used for measurement of angles, distances, etc., for the purpose of planning the targeted treatment. Modern dental equipment enables cephalometric imaging in dedicated versions of dental X-ray systems only, and these require a substantially larger working space in the X-ray room compared to panoramic-only X-ray systems. The method of this invention will allow for generating a cephalometric image using a similarly compact system geometry as used for panoramic imaging.

Another medical X-ray application that could benefit from the method of this invention is mammography. A current trend in mammography is the growing proliferation of Digital Breast Tomosynthesis (DBT), which promises a noticeable increase in sensitivity, i.e. the ability to detect objects inside the breast, and specificity, i.e. the ability to classify detected objects into malignant or benign classes, over traditional 2D X-ray mammography. Primary objects of interest for X-ray mammography are either large areas exhibiting a small contrast difference to normal glandular tissues, i.e. tumors, or objects with high contrast and dimensions smaller than or comparable to the X-ray detector pixel size, i.e. calcifications. In both cases, the mammography diagnostic system should exhibit excellent contrast sensitivity to enable positive identification and further classification of these objects of interest by a trained radiologist. In patients with dense breast tissue, the X-ray beam attenuation is higher than typical and objects of interest show reduced visibility when using traditional mammography techniques. This increases the false negatives diagnostics rate, and results in an increase in missed malignant cancers.

The DBT technique requires the acquisition of multiple images at different angles of incidence of the X-ray beam while the breast and X-ray detector are held static. Because the internal structure of the breast is observed at different angles, the detectability of objects inside the breast is improved. A DBT stack of slices is generated from the totality of acquired individual images at different angles and presented to the radiologist as a stack of slices for individual review. This is often accompanied by a single synthetic 2D image containing a 'summary' of objects of interest from all slices.

This invention significantly improves the way the DBT procedure is executed. From a single scan of a breast with an area mode X-ray detector operating in continuous frame capture mode, the full tomosynthesis stack of slices can be generated. System image acquisition and image generation for a DBT system utilizing the method of this invention will not be different from the description of the panoramic X-ray modality.

As previously explained, the narrow DOF of X-ray detectors operating in TDI mode limits their use to niche applications. An example of narrow DOF applications like this is X-ray PCB solder inspection. In this case, the area of interest is a shallow plane and the TDI DOF is adequate for the imaging requirements in this application.

Because of their large DOF and ability to image continuously while providing output imaging data in real time, the majority of scanning X-ray imaging is still performed using line-scan X-ray detectors. This invention eliminates the weaknesses of TDI X-ray imaging, and allows for upgrading from line-scan X-ray detectors to better performing X-ray imaging devices that offer a number of very substantial benefits in various application areas.

Industrial and security X-ray inspection applications of continuously moving objects are currently almost exclusively using line-scan X-ray detectors. An example of such application is airport security baggage inspection. A large DOF is a critical performance requirement for this application and, in combination with the low cost of line-scan X-ray detectors, results in the dominant position of line-scan X-ray detectors in these types of applications. This invention overcomes the inherent DOF limitations of the otherwise advantageous TDI imaging principle, and makes it possible to upgrade the application with better performing imaging technology.

FIGS. 9A-9C illustrate the image quality improvements when applying the method according to the invention for the case of conveyer belt applications. The object for examination was a cardboard box approximately 20 cm high and filled with different objects. The transportation system allowed for linear movement of the object in relation to a stationary X-ray source and X-ray detector, while the X-ray detector was operating in continuous frame capture mode.

Figure 9:
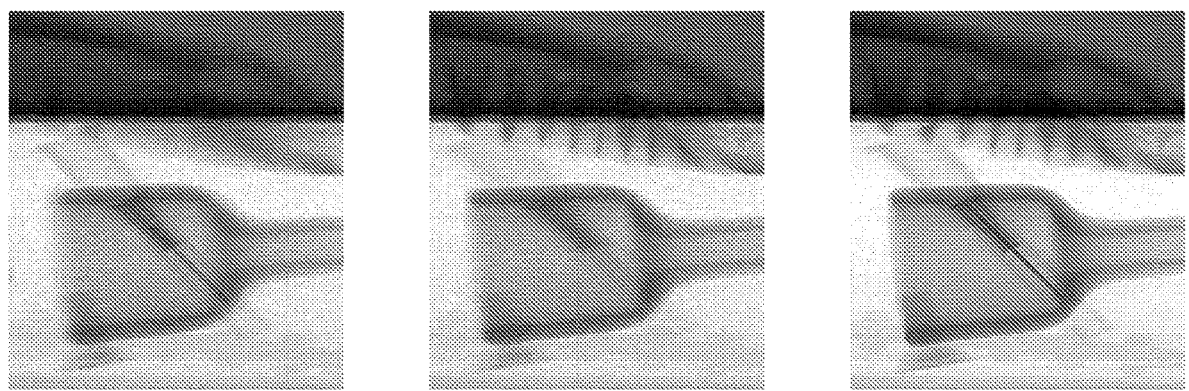
FIG. 9 illustrates an application of the invention for security.

As explained earlier, the speed control of TDI operation of the X-ray detector allows for adjustment of the position of TDI focal plane over the SID. FIG. 9 (left) and FIG. 9 (middle) show the imaging results when the TDI focal plane is at the bottom and at the top of the box, respectively. It is obvious that the narrow DOF of a standard TDI operation makes it impossible to reveal the contents of the box with adequate overall sharpness. The image in FIG. 9 (right) shows the synthetic 2D image from a tomographic stack of 19 images, generated in accordance with the present invention using the same data as used to generate the images in FIG. 9 (left) and (right). All of the objects in the image in FIG. 9 (right) are in focus and are easily recognizable as the DOF for this experiment has been effectively increased to 20 cm.

All embodiments above are provided for imaging modes using a poly-energetic X-ray beam, and X-ray detectors generating an output signal proportional to the total amount of energy captured by the pixel. Substantially higher information content can generally be produced by X-ray images where the X-ray setup is capable of energy discrimination. Additional information from spectrum changes for the object under study provides means to differentiate between various materials or differences in composition of the object, as well as increases the dynamic range of the X-ray images. The proposed method of this invention is not dependent on the technology for X-ray capture in the X-ray detector, and therefore is in general compatible with dual energy and energy discrimination principles of X-ray imaging using energy discrimination at detector level.

Another method of dual-energy imaging can be realized by imaging with alternating X-ray tube high voltage. An example of such application is Contrast Enhanced Digital Mammography (CEDM), where the difference between two breast images taken each having different high voltage settings applied to the X-ray tube is evaluated. Images are taken within quick succession with contrast agent injected into the breast before the examination. Using the method of this invention would allow performing contrast enhanced DBT, which is beyond the capabilities of any of commercial DBT system currently on the market.

In general, the method of the invention allows the use of the generated 2D and 3D images for performing measurements of distances, angles, etcetera between the visualized features of the object with high precision, e.g. for biometrical purposes.

Figure 10A:
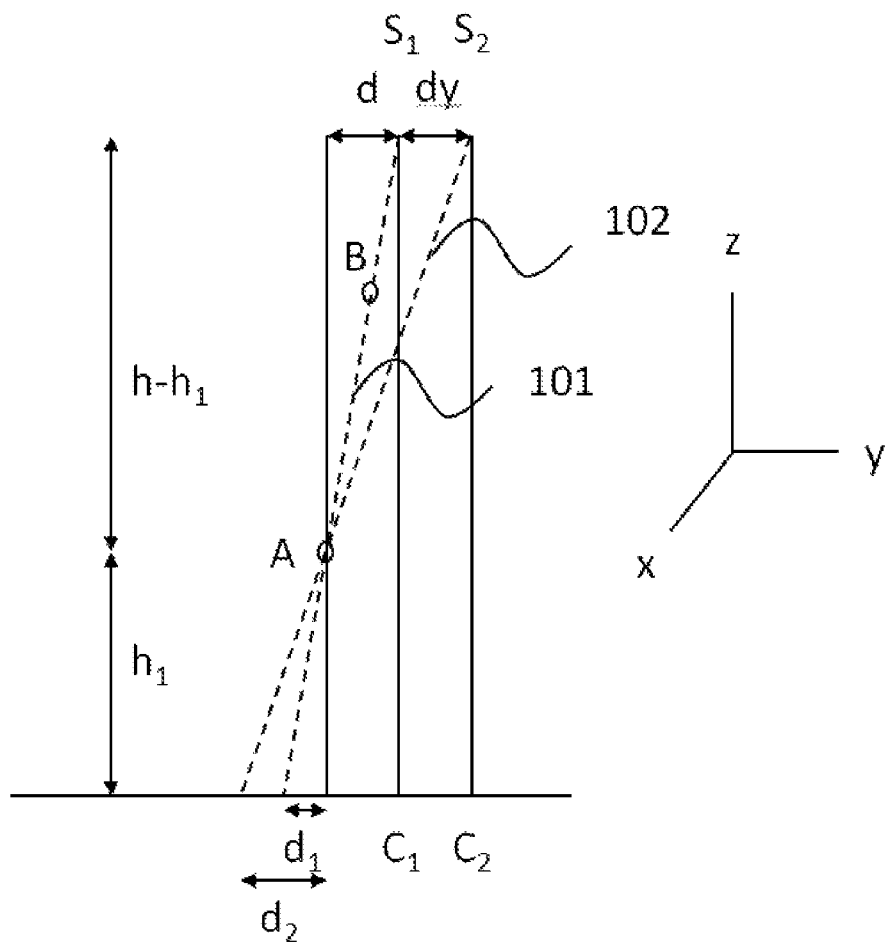
FIGS. 10A and 10B illustrate the principle of the shift-and-add method.
Figure 10B:
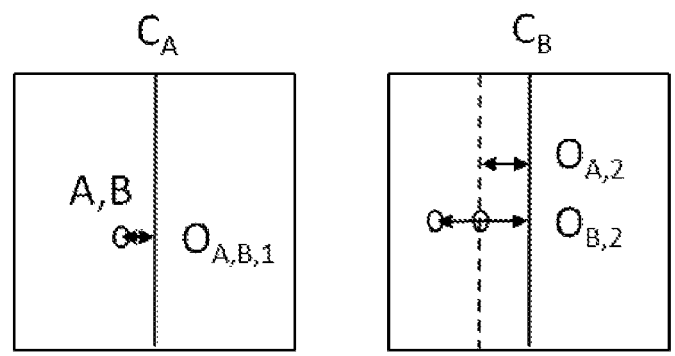

FIGS. 10A and 10B illustrate the known principle of the shift-and-add method that is used in the present invention. In FIG. 10A, the X-ray source and X-ray detector have a fixed mutual positioning and are moved between two positions relative to an object having internal features A and B. More in particular, the X-ray source is at a position $S_1$ when recording a first image, depicted on the left in FIG. 10B, and at a position $S_2$ when recording a second image depicted on the right in FIG. 10B. Similarly, FIG. 10A illustrates two center lines $C_1$, $C_2$ that represent the center line of the X-ray detector at the time of recording image 1 and image 2, respectively. In FIG. 10A, the movement of the X-ray detector and X-ray source is such that a distance between feature A of the object and the X-ray detector remains at value $h_1$, whereas a distance between feature A of the object and the X-ray source, or at least a line on which the X-ray source moves, is denoted by $h-h_1$. Here, h denotes the source to image distance (SID).

Line 101 indicates an X-ray that is emitted by the X-ray source at position $S_1$ and which passes through features A and B inside the object to be imaged. Consequently, in image 1 these features will appear at the same position in the image.

Line 102 indicates an X-ray that is emitted by the X-ray source at position $S_2$ and which passes through feature A inside the object to be imaged. As can be seen, line 102 does not pass through feature B. Consequently, in image 2 these features will not appear at the same position in the image.

FIG. 10A illustrates that feature A is at a distance $h_1$ relative to the X-ray detector. Using conventional geometry, one can deduce that $d_1/h_1=d/(h-h_1)$. The offset between $C_1$ and feature A in image 1, which equals the offset between $C_1$ and feature B in image 1, is denoted by $O_{A,B,1}$ and can be calculated using $O_{A,B,1}=d+d_1=(h/(h-h_1))\times d$.

Using conventional geometry, one can also deduce that $d_2/h_1=(d+dy)/(h-h_1)$. The offset between $C_2$ and feature A in image 2 is denoted by $O_{A,2}$ and can be calculated using $O_{A,2}=dy+d+d_2=(h/(h-h_1))\times d+(h/(h-h_1))\times dy$.

Comparing images 1 and 2, it can be concluded that feature A has been shifted in these images by an amount of $D=O_{A,B,1}-O_{A,2}=(h/(h-h_1))\times dy$.

According to the invention, a new image can be constructed by using images 1 and 2, wherein the positional shift is compensated for. For instance, to compute a pixel value in the combined image at position (x,y), the pixel value of image 1 at position (x,y) could be added to the pixel value of image 2 at position (x, y+D). In this manner, an image will be obtained wherein features of the object in the plane defined by $z=h_1$ will be in focus and wherein other features are blurred. Such image is referred to as a focal plane.

A plurality of focal planes can be calculated for various values of z. This allows focused information to be obtained for different positions z inside the object. These focal planes can be used for generating a final image using a focus stacking method.

From the equation $D=O_{A,B,1}-O_{A,2}=(h/(h-h_1))\times dy$ stated above, it can be concluded that if the focal plane corresponds to an area inside the object close to the X-ray source, i.e. $h_1$ approaches h, D will become very large. On the other hand, if the focal plane corresponds to an area inside the object close to the X-ray detector, D will approach dy.

Although the invention is explained using detailed embodiments thereof, the skilled person readily understands that various modifications are possible without deviating from the scope that is defined by the appended claims and their equivalents.

The invention claimed is:

1. A method for processing a plurality of X-ray images of an object that have been obtained using an X-ray source and an X-ray detector, wherein each of the images corresponds to a different positioning of the X-ray source, the X-ray detector, and the object relative to each other, the method comprising:
using a shift-and-add method for generating a plurality of focal planes from the plurality of X-ray images, each focal plane being associated with a different area inside the object; and
using a focus stacking method for generating a 2D image from the plurality of focal planes.

2. The method according to claim 1, wherein the X-ray detector is an area mode X-ray detector operating in continuous frame capture mode.

3. The method according to claim 1, wherein the X-ray source and the X-ray detector are kept at a fixed positional relationship with respect to each other during the obtaining of the plurality of X-ray images.

4. The method according to claim 3, wherein, during the obtaining of the plurality of X-ray images, the X-ray source and the X-ray detector are moved, and the object is kept stationary.

5. The method according to claim 4, further comprising digitally correcting a generated focal plane to account for scale distortion caused by a movement of a center of rotation of the combination of the X-ray source and the X-ray detector during the movement thereof to produce a corrected focal plane.

6. The method according to claim 1, further comprising equaling a size of the focal planes at least in a direction where a shift of the underlying X-ray images has been applied during the shift-and-add method.

7. The method according to claim 1, further comprising storing the plurality of X-ray images from the X-ray detector in computer memory prior to performing the shift-and-add method or the focus stacking method.

8. The method according to claim 1, further comprising using a depth map of respective areas that are in sharpness in respective focal planes for constructing a 3D model of the object.

9. The method according to claim 1, wherein the shift-and-add method or the focus stacking method is performed in real-time using a Graphic Processing Unit.

10. The method according to claim 1, further comprising selective image processing of some areas of the focal planes before performing the focus stacking method, to control a depth-of-field (DOF) in the generated 2D image.

11. The method according to claim 10, wherein the selective image processing of some areas of the focal planes before performing the focus stacking method comprises blurring areas that do not correspond to a region of interest of the object.

12. The method according to claim 1, further comprising associating a set of shift values to X-ray images among the plurality of X-ray images, shifting the individual X-ray images by their associated shift value, and adding the plurality of X-ray images after performing said shifting.

13. The method according to claim 12, further comprising selecting the set of shift values for the shift-and-add method to achieve a non-uniform spatial density of the plurality of generated focal planes.

14. The method according to claim 1, wherein the plurality of X-ray images have been obtained using an X-ray source that emits X-rays having an X-ray energy distribution that alternates between two or more different distributions, wherein the plurality of X-ray images comprises a plurality of subsets of X-ray images, each subset of X-ray images corresponding to one particular X-ray energy distribution, the method further comprising performing the shift-and-add method and the focus stacking method for each subset of X-ray images separately to generate a respective 2D image.

15. The method according to claim 14, further comprising generating a single 2D image from the respective 2D images.

16. An X-ray system, comprising:
an X-ray source;
an X-ray detector;
a moving unit for causing a relative movement between an object to be imaged and at least one of the X-ray detector and the X-ray source during a process of obtaining a plurality of X-ray images; and
an image processing unit configured to generate a plurality of focal planes from the plurality of X-ray images using a shift-and-add method, each focal plane being associated with a different area inside the object, and generate a 2D image from the plurality of focal planes using a focus stacking method.

17. The X-ray system according to claim 16, further comprising a mounting frame, wherein the X-ray source and the X-ray detector have a fixed positional relationship, wherein the X-ray system is configured to, using the moving unit, move the object relative to the X-ray source and X-ray detector, which are kept stationary relative to the mounting frame, or to move the X-ray source and the X-ray detector relative to the object, which is kept stationary relative to the mounting frame.

18. The X-ray system according to claim 16, further comprising a memory for storing the plurality of X-ray images from the X-ray detector prior to performing the shift-and-add method or the focus stacking method.

* * * * *